Nov. 24, 1936. H. J. ZERBST 2,062,156
LICENSE PLATE HOLDER
Filed Jan. 9, 1936
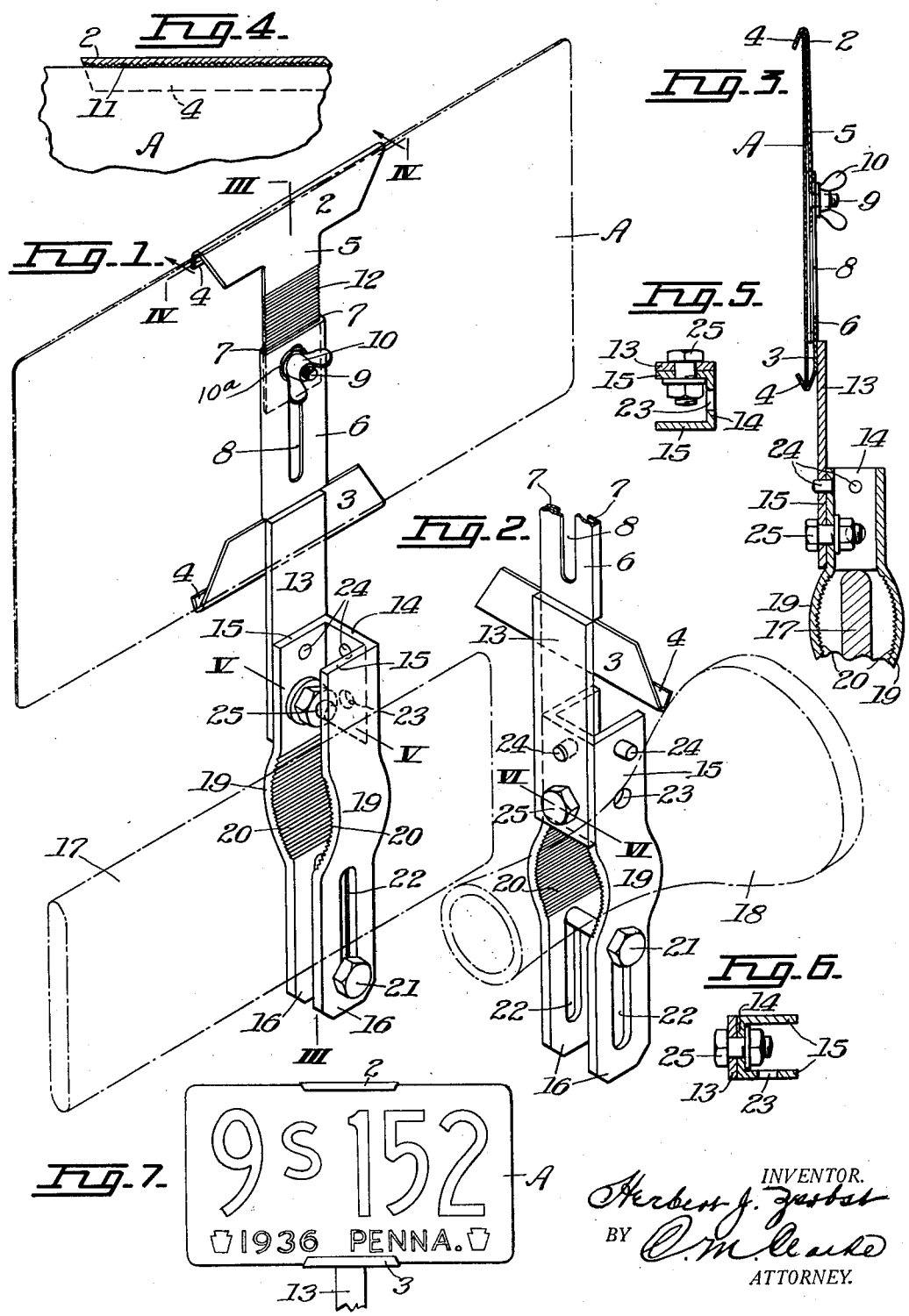
INVENTOR.
Herbert J. Zerbst
BY
ATTORNEY.

Patented Nov. 24, 1936

2,062,156

UNITED STATES PATENT OFFICE 2,062,156

LICENSE PLATE HOLDER

Herbert J. Zerbst, Pittsburgh, Pa.

Application January 9, 1936, Serial No. 58,286

8 Claims. (Cl. 248—229)

My invention consists of an improved construction of adjustable license plate holder, adapted for application and use on motor vehicles. One of the objects in view is to provide such a holder of standard construction capable of easy and positive application to both the front and back of the vehicle.

To this end I provide an improved form of supporting clamp capable of mounting application on either a transverse supporting element, as a front buffer, or on a longitudinal supporting element, as the stem or neck of a rear lamp. The clamp, for either such application is provided with an upper channel form terminal adapted to be connected by its middle web portion or by one flange portion, with the supporting stem or arm of the license plate holder, for proper face location of the plate.

The plate holder itself is composed of a pair of edge gripping members capable of being placed in firm constantly holding engagement with the upper and lower edges of the plate, and having a lower supporting arm for connection with the web or flange of the clamp terminal.
The entire device is provided with means for servicing and applying adjustability, and for positive gripping engagement throughout, as shall be more fully hereinafter described.

One preferred construction of the invention is illustrated in the accompanying drawing, in which:

Fig. 1 is a perspective view showing the invention mounted on a transverse member of the vehicle, as a buffer bar, for front location of the plate;

Fig. 2 is a similar view showing the clamp mounted on a longitudinal member of the vehicle, as the stem of a rear lamp or the like, for rear location of the plate;

Fig. 3 is a vertical sectional view of the plate holding clamps on the line III—III of Fig. 1;

Fig. 4 is a sectional view on the line IV—IV of Fig. 1, showing the plate edge gripping construction of the clamping member terminals;

Fig. 5 is a cross section on the line V—V of Fig. 1;

Fig. 6 is a cross section on the line VI—VI of Fig. 2;

Fig. 7 is a face view of the plate as grasped by the clamps, from the front.

The plate holding clamps comprise a pair of upper and lower rear clamping members 2 and 3 respectively, formed of thin sheet or plate metal construction, each having a reversely turned front edge flanged portion 4. These provide a longitudinal flange and groove for embracing engagement with the upper and lower edges respectively of the license plate A, indicated in dotted lines in Fig. 1.

Upper member 2 is provided with a downwardly extending flat arm member 5 making face to face contact with a corresponding extension 6 of lower member 3, and preferably in telescoping engagement therewith by means of inwardly turned edge retaining flange portions 7 thereof.
One of such extensions, as 6, is provided with a longitudinal clearance slot 8 for movement therethrough of a securing screw or stud 9, fixedly connected with the other arm 5, and capable of tightening engagement therewith of arm 6 by means of a thumb nut 10 or the like, preferably with a lock nut washer 10a. Stud 9 may be riveted or otherwise secured to arm 5, and is thus capable of vertical adjustment in tightening or loosening the clamping connection with the license plate, by movement in either direction, when the thumb nut is released.

The inner groove portion between the widened terminal 2 and 3 and its reversely turned flange 4, one or both, is preferably provided with a series of teeth or serrations 11, adapted to make direct engagement against the upper and lower edges of plate A, when the members are closed thereon and securely held in position by the tightening means.

By reason of the engaging reversely turned flanges 7 of member 6, with just sufficient clearance for easy sliding engagement of member 5 within and against member 6, the parts may be accurately guided and maintained in their desired relative positions.

For assisting in firm connection between the two members 5 and 6, the contacting face of one member is serrated or slightly roughened or grooved as indicated at 12. Thus when the thumb nut 10 is tightened, they will be drawn together into positive holding and non-slipping engagement, preventing accidental loosening or disturbance.

Extending downwardly from lower clamping member 6 is a flat supporting arm 13, secured to the lower portion, as against the lower clamping member 3, by welding, riveting or the like.

Arm 13 is adapted to be secured either upon the flange or web portion of the lower clamp member, so as to be capable of mounting thereon in either of two such positions and on a plane at right angle to the other securing plane. By such attachment I am enabled to adapt the device to proper connection and mounting for proper confronting exposure of the license plate, either forwardly or rearwardly.

The supporting clamping member is therefore so constructed as to be capable of mounting on either a transverse web or a longitudinal stem member, or on two such members as preferred or desired. When thus mounted the arm 13 may be attached to either the web portion or the flange portion of the clamp and to be properly positioned independent of the particular position in which the clamp itself may be located. Two different manners of thus mounting the clamp are illustrated in Figs. 1 and 2 respectively, the flat face securing means in one case being at a 90° variation from the other, as will be readily understood.

The clamp itself consists of an upper preferably integral portion of channel form, providing the middle web section 14 and the spaced apart flange sections 15—15 respectively, at right angles to the web and in parallelism with each other, with ample intervening space for location of the securing nuts as shown. The web portion 14 extends downwardly just sufficiently far to provide for such face to face attachment, beyond which extend the downwardly disposed somewhat resilient clamping arms 16, 16, of similar construction.

Said arms are sufficiently long to engage over and embrace the opposite sides of a transverse bar, as a buffer bar 17, indicated in dotted lines, Fig. 1, or to grasp the neck or stem portion of a lamp 18, indicated in dotted lines, Fig. 2. For such grasping engagement of the opposite sides of such a cylindrical stem or bar the arms 16 just below the lower edge portion of web 14, are preferably resilient and rounded outwardly as at 19, approximating part cylindrical form for thus grasping the stem or bar.

The inner faces of such rounded portions of the clamping arms are preferably serrated or toothed transversely as at 20 whereby to make positive non-slipping connection with the cylindrical stem, when tightened thereon by a securing bolt 21 and its companion nut.

As stated, the clamping arms 16 are sufficiently long to extend over each side of a comparatively wide buffer bar or the like. In order to provide ample latitude for such application, and also to enable attachment to a stem by the outwardly rounded portions 19, I provide each arm with an elongated slot 22 as shown. The holding bolt 21 may thus be located downwardly or upwardly, as desired, and then tightened. When applied to a buffer bar 17 the clamp is lowered thereon until the lower edge of the web 14 engages the upper edge of the transverse bar, and the side arms 16 are drawn tightly against its lower portion, and secured by the bolt for firm connection.

In applying the clamp to a rear cylindrical stem or bar, longitudinal of the vehicle and at right angles to bar 17, arms 16 are sprung over it and then tightened by the bolt. In such case the bolt is located at the upper portions of slots 22, closely below the stem, as in Fig. 2.

It will thus be seen that in one such position the flanges 15 are transverse of the vehicle and in the other position, the web 14 is transverse, each thus being in proper position for attachment of the flat connecting arm 13 of the license plate holder proper.

I therefore provide one of the flanges and the web with a bolt hole 23 and a stud or dowel pin 24 adapted to register with corresponding holes in the lower end of arm 13. Arm 13 being placed in position is tightly held by bolt 25 and its nut, the dowel pin and hole connection thus maintaining the plate holder in fixed erect position.

As thus constructed the device is capable of application and use either at front or back of a vehicle, entirely independent of any supplemental brackets or the like. The mounting clamp in each case is mounted on its support and held by a single bolt. A single bolt connects and firmly holds the arm 13 to the clamp, and but a single bolt is required with the plate holder itself. All of the parts of a set of two are in exact duplicate for simplicity and cheapness, while the plate holder members are very light, strong and serviceable.

The device is capable of connection and use with license plates or the like of varying dimensions, either width or length, and dispenses with the necessity of bolt holes or bolting attachment. It is comparatively cheap and simple, not liable to become loose or get out of order, and may be put on and used, or removed, by anyone capable of using a wrench and of ordinary skill.

The invention may be changed or varied in detail construction or otherwise, but all such changes are to be understood as within the scope of the following claims.

What I claim is:—

1. A license plate holder consisting of an upper sheet metal member having a bent over edge portion providing a front upper grasping groove and a rear integral downwardly extending shank, a lower sheet metal member having a similar bent over edge portion providing a front lower grasping groove and a rear integral upwardly extending overlapping shank telescoping said downwardly extending shank, means connecting said shank members providing longitudinal adjustment thereof, and a supporting arm extending from one of said members.

2. A license plate holder consisting of an upper sheet metal member having a bent over edge portion providing a front upper grasping groove and a rear integral downwardly extending shank, a lower sheet metal member having a similar bent over edge portion providing a front lower grasping groove and a rear integral upwardly extending overlapping shank having its side edges bent around and slidably engaging the other shank, means connecting said shanks, and a supporting arm extending downwardly from the lower shank member.

3. In combination with a license plate holder consisting of an upper sheet metal member having a bent over edge portion providing a front upper grasping groove and a rear integral downwardly extending shank, a lower sheet metal member having a similar bent over edge portion providing a front lower grasping groove and a rear integral upwardly extending overlapping shank, one of said shanks having a longitudinal slot and the other having a securing stud extending therethrough with an outer tightening nut, and a supporting arm extending downwardly from the lower shank member; a support therefor having its upper end provided with a plurality of angle faced vertical surfaces for engagement with either of such surfaces by the lower end of the lower shank member supporting arm.

4. In combination with a license plate holder consisting of a pair of oppositely disposed upper and lower sheet metal edge-engaging members each provided with a reversed flange providing a holding groove and a connecting shank, one of said shanks overlapping the other lengthwise and having side edge and back embracing flanges for sliding movement thereon and a longitudinal slot, a stud bolt secured to said other shank projecting through said slot and having a tightening nut, and a flat faced arm extending downwardly from the lower shank; a support therefor having its upper end provided with a plurality of rectangularly arranged vertical faces for engagement with either face by the lower end of the lower shank member supporting arm, and means connecting said arm to said face.

5. In combination with a license plate holder consisting of a pair of oppositely disposed upper and lower sheet metal edge-engaging members each provided with a reversed flange providing a holding groove and a connecting shank, one of said shanks overlapping the other lengthwise and having side edge and back embracing flanges for sliding movement thereon and a longitudinal slot, said other shank having a roughened surface on its contacting face and a stud bolt secured thereto projecting through said slot and having a tightening thumb nut, and a flat faced arm extending downwardly from the lower shank; a support therefor having its upper end terminating in an integral rectangular channel providing a plurality of flat vertical faces for engagement with either face by the lower end of the lower shank member supporting arm, and means connecting said arm to one of said faces.

6. A license plate holder comprising a pair of adjustably connected plate grasping members and a lower flat supporting arm, and a bifurcated mounting member therefor consisting of a pair of spaced apart clamping arms terminating in a plurality of upper flanges at right angles to each other and a connecting web providing a plurality of angularly disposed attaching faces for the supporting arm of the plate holder.

7. In combination with a license plate holder having a downwardly extending flat supporting arm, a bifurcated mounting member therefor consisting of a pair of spaced apart clamping arms terminating in upper flat end portions and an integral connecting web, one of said flat end portions and the web providing a plurality of angularly disposed attaching faces for the supporting arm of the plate holder.

8. In combination with a license plate holder having a downwardly extending flat supporting arm, a bifurcated mounting member therefor consisting of a pair of spaced apart clamping arms having outwardly rounded middle support-clamping portions and terminating in upper flat end portions and an integral connecting web, one of said flat end portions and the web providing a plurality of angularly disposed attaching faces for the supporting arm of the plate holder, the opposite free end portions of the arms being longitudinally slotted, and a tightening bolt extending therethrough.

HERBERT J. ZERBST.